Sept. 11, 1928.
R. T. POLLOCK
1,683,801
APPARATUS FOR TREATING OIL
Original Filed Dec. 2, 1920
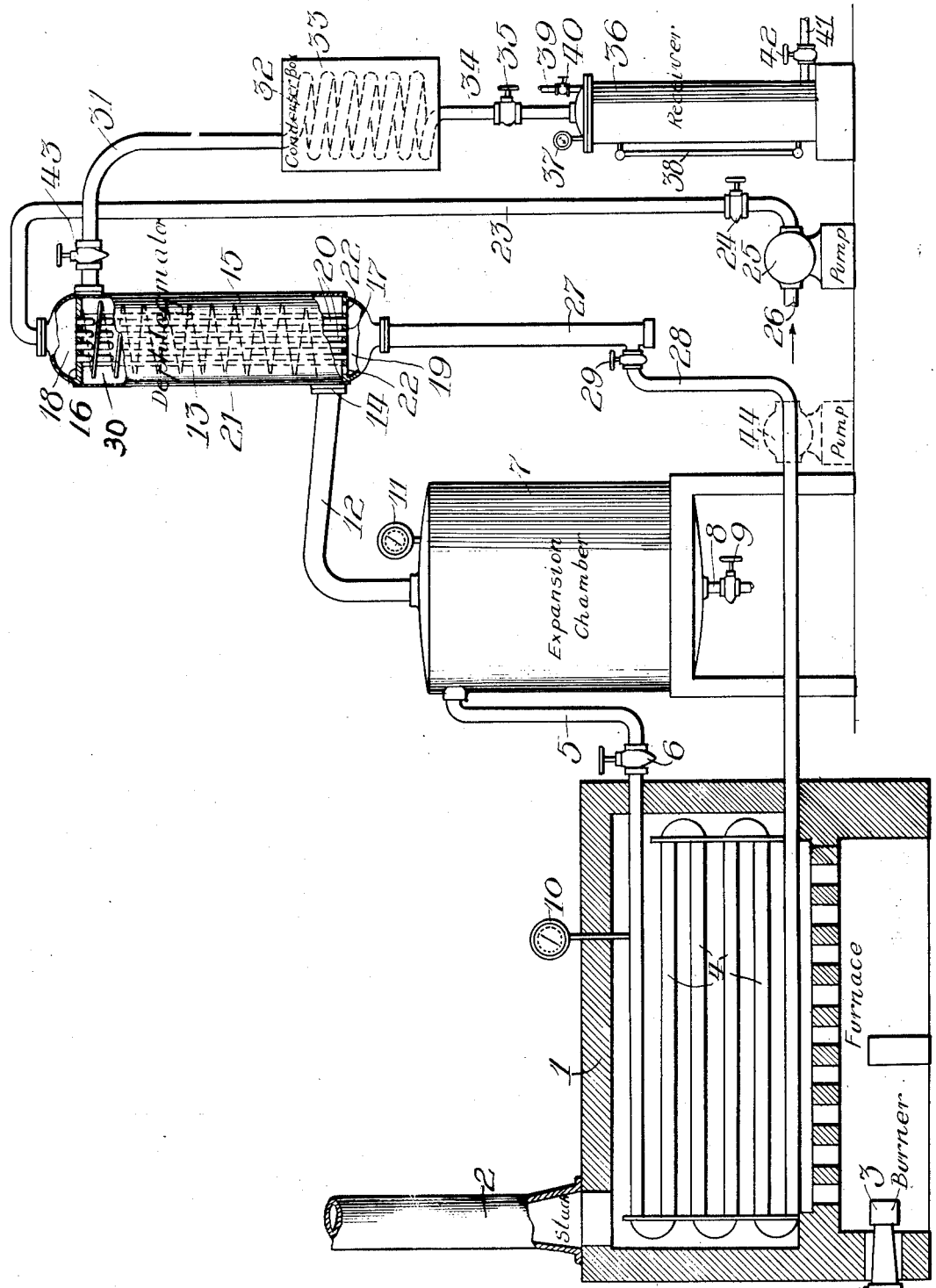
Witness:
Raymond H. Guth.
Inventor:
Robert T. Pollock.
by Frank L. Belknap, Atty.

Patented Sept. 11, 1928.

1,683,801

UNITED STATES PATENT OFFICE.

ROBERT T. POLLOCK, OF NEW YORK, N. Y., ASSIGNOR TO THE UNIVERSAL OIL PRODUCTS COMPANY, OF CHICAGO, ILLINOIS, A CORPORATION OF SOUTH DAKOTA.

APPARATUS FOR TREATING OIL.

Original application filed December 2, 1920, Serial No 427,873. Divided and this application filed March 7, 1923, Serial No. 623,312. Renewed March 15, 1928.

This invention relates to an apparatus for treating oil, and more particularly refers to apparatus employed in a process for the conversion of heavy to lighter hydrocarbons, although in its broader aspects the invention is not necessarily so limited.

This application is a division of an application filed December 2nd, 1920, as Serial No. 427,873.

The invention is more specifically directed to the manner of dephlegmating the vapors and the mixing of the reflux condensate from the dephlegmator with the preheated raw oil without at the same time permitting the raw oil to come into physical contact with the uncondensed portions of the vapors passing through the dephlegmator. In other words, I use the raw oil which is to be treated to regulate the temperature of the dephlegmator and at the same time preheat it and mix it with the reflux condensate but I carefully avoid allowing the raw oil to come into contact with the uncondensed portions of the generated gases and vapors.

The single figure shows a view partly in section and partly in side elevation of my improved apparatus for carrying out my process.

Referring in detail to the drawings, 1 designates the furnace provided with stack 2, and burner 3. In the furnace is mounted the heating element or chamber which in the present instance takes the form of a closed coil 4, as for example, a continuous coil of 4" or 6" pipe. The discharge side of the coil is connected by transfer line 5 having throttle valve 6 to expansion or vapor chamber 7. This expansion chamber is provided with a liquid drawoff line 8 controlled by throttle valve 9, whereby the residue may be continuously drawn out of the system. The coil and vapor chamber are each provided with pressure gauges 10 and 11 respectively. The vapor chamber is provided with the gooseneck or vapor outlet pipe 12 connected to the side of a dephlegmator 13 near the lower end of the latter as shown at 14. This dephlegmator consists of an elongated cylindrical drum 15 provided near its upper and lower ends respectively with partition members 16 and 17 forming the chambers 18, 30 and 19. Suitably supported in the two partitions are a series of small vertical tubes 20 which form the connection between the chambers 18 and 19. Surrounding the tubes 20 is a helical baffle member 21, this baffle member being slightly spaced away from the tubes and also from the side of the drum 15. The lower partition member 17 is provided with a plurality of apertures or openings 22 to permit the reflux condensate to enter the chamber 19.

The raw oil is fed to the chamber 18 through the line 23 having throttle valve 24, which line 23 is connected to the discharge side of the raw oil feed pump 25. The inlet side of the pump is connected by line 26 to any suitable source of supply. The lower part of the chamber 19 is provided with the oil leg 27, which is connected by line 28 having valve 29 to the inlet or feed side of the heating coil 4. The upper part of the chamber 30 formed between the partition members 16 and 17 is provided with the vapor outlet pipe 31 connected to condenser coil 32 seated in condenser box 33. The lower end of the coil 32 is connected by pipe 34 having throttle valve 35 to the top of receiver 36. This receiver 36 is provided with pressure gauge 37, liquid level gauge 38, gas outlet pipe 39 having throttle valve 40 and liquid drawoff pipe 41 controlled by throttle valve 42.

In carrying out the process, the raw oil is fed through the tubes in the dephlegmator and thence through the main feed line to the inlet side of the heating coil. This oil, as for example, Kansas gas oil of say, 32 degrees Baumé, may be heated to a temperature of say, 750 degrees F., and the whole system maintained from the heating coil to the receiver, under a pressure of 150 pounds. The oil in liquid phase is delivered to the vapor chamber where vaporization takes place. The residue containing precipitated carbon is drawn off from the vapor chamber through line 8, the vapors passing out into the vapor outlet pipe into the lower part of the dephlegmator. As they rise, they are compelled to pass by the helical baffle, the heavier vapors being condensed and pass out through the apertures 22 in the plate 17 to the leg 27, where they meet the preheated raw oil. The uncondensed vapors and uncondensable gas pass out to the condenser and thence to the receiver.

It will be noted that the raw oil is preheated and also acts as the cooling medium for the vapors in the dephlegmator. The apertures 22 in the perforated plate 17 are preferably of such a size as to permit the reflux condensate to pass into the leg 27.

The process may also be carried out as follows: Instead of maintaining uniform pressure on the entire system, a differential pressure may be maintained on the system, as for example, 250 pounds on the heating coil, 200 pounds on the expansion chamber, 100 pounds on the dephlegmator and condenser. If desired, a throttle valve 43 may be interposed on the vapor pipe 31 and a less pressure maintained on the condenser than on the dephlegmator. Where a less pressure is maintained on the dephlegmator than on the heating coil, it will probably be desirable to interpose a pump 44 shown in dotted lines in the line 28.

The processes referred to are especially advantageous in economy of fuel consumption, in well regulated dephlegmation and also in preventing the uncondensable gases and uncondensed vapors from mixing with the raw oil. Otherwise, the raw oil might absorb some of the lighter vapors and uncondensable gases and unnecessarily send them through the system again.

I claim as my invention:

1. In an apparatus for cracking hydrocarbon oil, the combination of a dephlegmator comprising an elongated vertical cylindrical shell, partition members located in said shell near each end thereof forming upper and lower compartments and an intermediate compartment, a vapor inlet and a vapor outlet communicating with said intermediate compartment, a plurality of tubes mounted in said partitions and constituting a communication between the upper and lower compartments of said dephlegmator, said lower partition member being provided with apertures through which the reflux condensate formed in the intermediate compartment can pass from said intermediate compartment into said lower compartment, means for feeding raw oil into the upper compartment of said dephlegmator and means for withdrawing said raw oil and reflux condensate from the lower compartment of said dephlegmator.

2. In an apparatus for treating hydrocarbon oil, the combination of a dephlegmator comprising an elongated cylindrical shell having an upper and a lower partition member forming upper and lower compartments and an intermediate compartment, a plurality of tubes mounted in said partitions constituting an open communication from the upper to the lower compartments, vapor inlet and outlet openings, communicating with said intermediate compartment, a helical baffle spaced from the walls of said intermediate compartment and extending between said vapor inlet and outlet openings, said lower partition member being provided with apertures through which the reflux condensate formed in the dephlegmator is adapted to pass from said intermediate compartment into said lower compartment, means for feeding raw oil into said upper compartment to pass through said plurality of tubes into said lower compartment to intermingle therein with the reflux condensate and means for withdrawing the intermingled raw oil and reflux condensate from said lower compartment.

3. In an apparatus for cracking hydrocarbon oil, the combination of a dephlegmator comprising a vertical, cylindrical shell, partition members located in said shell near each end thereof forming upper and lower compartments and an intermediate compartment, a vapor inlet and a vapor outlet communicating with said intermediate compartment, means extending through said intermediate compartment connecting the upper and lower compartments of said dephlegmator, said lower partition member being provided with apertures through which the reflux condensate formed in the intermediate compartment can pass from said intermediate compartment into said lower compartment, means for introducing a cooling medium into the upper compartment of said dephlegmator, and means for withdrawing said cooling medium and reflux condensate from the lower compartment of said dephlegmator.

ROBERT T. POLLOCK.